United States Patent [19]

Lin

[11] 4,332,589
[45] Jun. 1, 1982

[54] METHOD FOR POLYMERIZATION OF LIGNOSULFONATES

[75] Inventor: Stephen Y. Lin, Wausau, Wis.

[73] Assignee: American Can Company, Greenwich, Conn.

[21] Appl. No.: 209,478

[22] Filed: Nov. 24, 1980

[51] Int. Cl.³ .................. C09B 67/00; C07G 1/00
[52] U.S. Cl. .......................................... 8/557; 8/527; 8/589; 252/8.7; 260/124 R
[58] Field of Search ............... 260/124 R; 8/589, 557, 8/527; 252/8.7

[56] References Cited

U.S. PATENT DOCUMENTS

| | | | |
|---|---|---|---|
| 3,138,555 | 6/1964 | King et al. | 260/124 R |
| 3,470,148 | 9/1969 | Allan | 260/124 R |
| 3,600,308 | 8/1971 | Allan | 260/124 R |
| 3,864,276 | 2/1975 | Benko et al. | 252/317 |
| 4,100,155 | 7/1978 | Ashorn et al. | 260/124 R |

Primary Examiner—A. Lionel Clingman
Attorney, Agent, or Firm—Robert P. Auber; Stuart S. Bowie; Ernestine C. Bartlett

[57] ABSTRACT

A method is provided for polymerizing lignosulfonate materials without undesirable viscosity build-up or gelling. The method comprises the steps of premethylolating the lignosulfonate under alkaline conditions followed by condensation of the premethylolated lignosulfonate at elevated temperatures and under neutral and acidic conditions.

The resultant products are useful in any of a variety of applications wherein the surface active properties of lignosulfonates may be desirable. The products are useful as dispersants and especially as dye dispersants.

20 Claims, 2 Drawing Figures

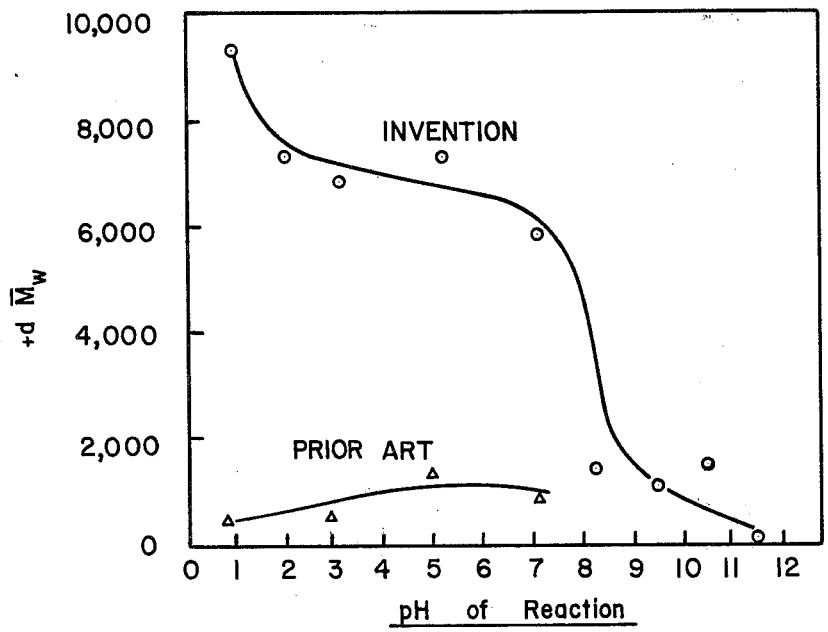
FIG.1 MOLECULAR WEIGHT INCREASE (+d $\overline{M}_w$) OF LIGNOSULFONATE AT VARIOUS REACTION pH VALUES
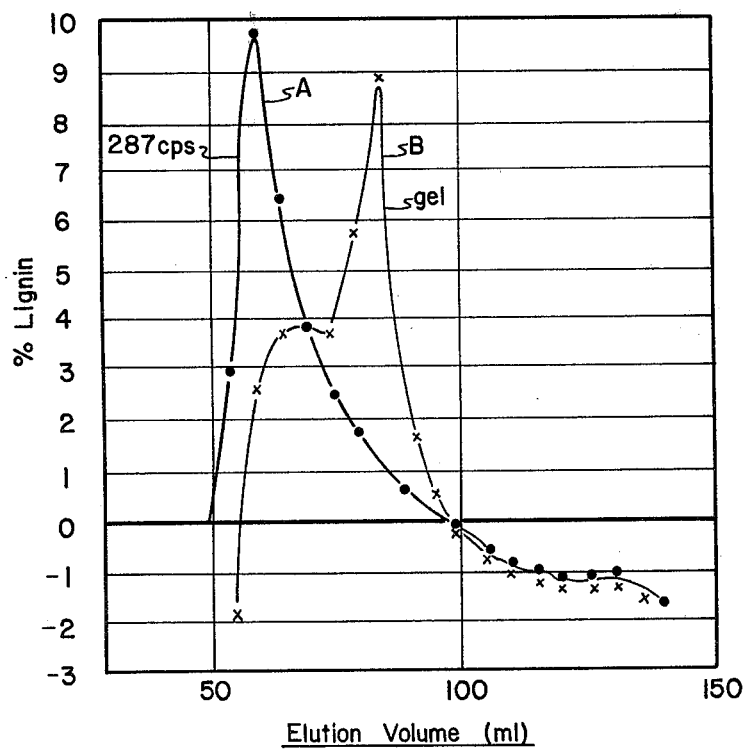
FIG.2 DIFFERENCE NORMALIZED GPC CURVES OF CONDENSED LIGNOSULFONATE BY THE INVENTION TWO-STEP PROCESS (A) AND BY ACID POLYMERIZATION (B)

METHOD FOR POLYMERIZATION OF LIGNOSULFONATES

BACKGROUND OF THE INVENTION

1. Field of the Invention

This invention relates to polymerization of lignosulfonate materials to produce fluid, high molecular weight, low viscosity products. More particularly, this invention relates to a process whereby lignosulfonate materials are initially methylolated under alkaline conditions and subsequently subjected to elevated temperature under acidic conditions to effect polymerization.

2. The Prior Art

Lignin, as it occurs in all woody plants, is a three-dimensional macromolecule consisting of rather hydrophobic phenylpropane units. In pulping processes for the manufacture of wood pulps, the lignin is chemically depolymerized and solubilized in pulping liquors to facilitate its removal from wood fibers. Consequently, industrial lignins isolated from the pulping liquors have molecular weights that are polydisperse and relatively low in comparison with the molecular weight of lignin as it occurs naturally in wood.

The relatively low molecular weight of industrial lignin such as lignosulfonates as compared with many commercially available synthetic polymers is a significant limitation which hinders the use of such materials in many application areas. For this reason, numerous methods have been proposed in the prior art for polymerization of lignins to increase their molecular weights. Thus, in U.S. Pat. No. 3,138,555 issued June 23, 1964 to King and Adolphson, an acid polymerization process is disclosed for condensation of lignosulfonate components of spent sulfite liquor-derived solids, under controlled conditions, thereby increasing the effectiveness of lignosulfonates as dispersants in clay-water suspensions, such as drilling muds. In U.S. Pat. No. 3,864,276 issued Feb. 4, 1975 to Benko and Daneault, useful dispersing agents for dyes are produced by condensation of water-soluble lignosulfonate with water-insoluble kraft lignin. In U.S. Pat. No. 3,857,830, issued Dec. 31, 1974, Briggs discloses a process for cross-linking lignosulfonates with di-epoxides to increase surface active properties and thus provide an improved flocculating agent. The process uses cross-linking agents such as di-epoxides having molecular weights in the range of from 120 to 1,800 and involves cross-linking to the extent that the phenolic content of the lignin is decreased by 40% to 95%. Ludwig, in U.S. Pat. No. 3,850,799, issued Nov. 26, 1974, describes a process whereby lignosulfonate is treated with a polyoxyalkylene di-ester of a monosulfonic acid or a polyoxyalkylene dihalide to obtain high molecular weight compositions which are effective as thickening and flocculating agents.

Known methods for polymerizing lignosulfonate may be classified into two types in terms of the mechanism by which cross-linking occurs:

(1) cross-linking or bridging of lignin molecules by reaction of free phenolic hydroxyl groups with bi-functional or trifunctional chemicals (hereinafter termed phenolic polymerization); and (2) condensing of lignin units at other non-phenolic sites (hereinafter termed non-phenolic polymerization).

In phenolic polymerization, lignin units are cross-linked, for example, by blocking the free phenolic hydroxyl groups with halogen- or epoxide-containing chemicals such as epichlorohydrin, di-epoxide and polyoxyalkylene dihalide. This type of polymerization reaction however has its accompanying disadvantages. Most notably it requires expensive cross-linking chemicals. Additionally, blocking of phenolic hydroxyl groups reduces the solubility of lignin and thus tends to increase the viscosity of reaction media. Moreover, lignin becomes deactivated via consumption of free phenolic hydroxyl groups making it unsuitable for use in many modification reactions which need free phenolic hydroxyl groups.

The disadvantages of phenolic polymerization are not present to the same extent in non-phenolic polymerization since the latter reaction mechanism is such that free-phenolic hydroxyl groups are not consumed and the lignin is not deactivated. In this reactive scheme, alkyl linkages are formed that are more stable at high temperature than the ether bonds formed via phenolic polymerization.

Non-phenolic polymerization methods for increasing the molecular weight of lignosulfonate materials have included (1) treatment with formaldehyde and kraft lignin at alkaline pH; (2) acid polymerization; and (3) treatment with formaldehyde at acidic pH.

Under alkaline conditions, lignosulfonates are condensable with non-sulfonated lignin such as kraft lignin. This is disclosed in the aforementioned U.S. Pat. No. 3,864,276. However, neither treatment of lignosulfonates in the absence of kraft lignin by heating to elevated temperature nor treatment of such lignosulfonates with formaldehyde results in condensation or polymerization to higher molecular weights when performed under alkaline conditions.

Acid polymerization, as exemplified by U.S. Pat. No. 4,100,155 issued July 11, 1978 to Ashborn and Laine and King et al U.S. Pat. No. 3,138,355 referred to above, requires heating lignosulfonate solution at acidic pH for a period sufficient to form products having a viscosity at least 25 percent higher than the viscosity of the starting material. In such reactions, selection of solids concentration is a critical factor since too low a concentration tends to hydrolyze the lignosulfonate rather than polymerize it. On the other hand, too high a concentration invariably results in thickening of the reaction solution.

Treatment of lignosulfonates with formaldehyde under acidic conditions invariably results in a substantial viscosity build-up or even gelling of the process solutions at the normal process solution concentrations of 20 to 40 percent solids. Upon gelling, the lignosulfonates are no longer cross-linkable and are thereby rendered unsuitable for use in many of the applications where higher molecular weight polymers may be used. Viscosity build-up and gelling are thus factors that severely limit the degree of polymerization that can be achieved with such non-phenolic polymerization methods.

A major object of this invention is to provide an effective method for obtaining high molecular weight lignosulfonates.

An additional object of this invention is to provide a simple process for the polymerization of lignosulfonates using formaldehyde as the cross-linking agent.

A further object of this invention is to provide a method for polymerization of lignosulfonates via a non-phenolic mechanism with minimal viscosity build-up of the reaction solutions.

SUMMARY OF THE INVENTION

These and other objects of the invention are accomplished by a method for polymerizing lignosulfonate materials to higher molecular weights which comprises:

(1) reacting a mixture of a lignosulfonate material and formaldehyde under alkaline conditions for a period sufficient to form a methylolated lignosulfonate; and (2) effecting condensation of said methylolated lignosulfonate under neutral and acidic conditions for a period sufficient to effect the desired polymerization.

The process results in a polymerized lignosulfonate of desired molecular weight without excessive viscosity build-up or gelling of the process solutions.

In its preferred embodiments, the method of the invention comprises the steps of:

(1) reacting a mixture of a lignosulfonate material with from about 0.5 to about 4.5 moles, preferably 1 to 3 moles of formaldehyde per 1,000 grams of lignosulfonate at a pH between about 10 to 12 and a temperature within the range of about 60° C. to about 90° C., preferably 70° C. to 80° C., for a period of time ranging from about 10 minutes to 2 hours to form a methylolated lignosulfonate; and (2) effecting condensation of said methylolated lignosulfonate by heating at an acidic pH below about 7 at an elevated temperature within the range of about 90° C. to about 180° C., preferably about 120° C. to 160° C., for a period of time sufficient to effect the desired polymerization, preferably for a period of at least one hour.

The method provides compositions of matter that are particularly useful as dye dispersants for disperse and vat dyes.

BRIEF DESCRIPTION OF THE DRAWINGS

FIG. 1 shows a comparison of the molecular weight increase ($+d\overline{M}w$) of softwood lignosulfonate obtained at various pH values by the prior art process wherein lignosulfonate is heated under acidic conditions, and, as obtained when lignosulfonate is premethylolated and condensed by the invention two-step polymerization process.

FIG. 2 shows the difference normalized gel permeation chromatographical (GPC) curves of condensed lignosulfonate obtained by the prior art acid polymerization wherein lignosulfonate is heated with formaldehyde at acidic pH without pre-methylolation and as obtained by the invention two-step process.

DETAILED DESCRIPTION OF THE INVENTION

The method of the invention is based on the unexpected discovery that lignosulfonate methylolated under alkaline conditions can be polymerized readily at acidic pH without excessive viscosity build-up of the reaction solution. Methylolation is accomplished by treatment of the lignosulfonate with formaldehyde under alkaline conditions and at a temperature of about 60° C. to 90° C. for a period which may vary from 10 minutes to 2 hours. In contrast to non-sulfonated lignin, for example, kraft lignin, which is readily condensable with formaldehyde at alkaline pH, methylolated lignosulfonate is stable under alkaline conditions for an indefinite length of time without significant polymerization. The thus methylolated lignosulfonate can be stored until a convenient time when the second step of the process is performed. It is then acidified to a pH below 7 and heated at a temperature between 90° C. to 180° C., preferably between 120° C. to 160° C., for a time period depending on the degree of polymerization desired, normally 1 to 5 hours.

For the purpose of this invention, analytical gel permeation chromatography (GPC) is employed to determine the molecular weight distribution of the lignosulfonate material. The theory of GPC is described in numerous texts, e.g., *Gel Chromatography*, by H. Determann, Springer-Verlay New York, Inc., (1968). In essence, it is a technique whereby macromolecules of different size (or molecular weight) are separated in homogeneous gels, and eluted with a suitable solvent in the order of decreasing molecular weight. In this manner, using a commercial gel, for example, Sephadex G-100, available from Pharmacia, Inc. as the separating medium and 0.1 N NaCl solution as the solvent, GPC curves of lignosulfonate samples are obtained, showing the quantity of lignin eluted at various lengths of time or elution volume. The quantity may be expressed as percent of total lignin and the curves are then termed "normalized gel permeation chromatography curves". Normalization of curves makes it possible to directly compare the molecular weight distribution of different lignin products.

Weight-average ($\overline{M}w$) and number-average ($\overline{M}n$) molecular weights of lignin were calculated according to the following formulations:

$$\overline{M}w = \sum_i w_i M_i \bigg/ \sum_i w_i$$

$$\overline{M}n = \sum_i w_i \bigg/ \sum_i (w_i/M_i)$$

where $w_i$ and $M_i$ are weight and molecular weight, respectively, of the $i^{th}$ fraction of the lignin sample. $w_i$ is determined by absorption at 280 nm and $M_i$ by calibration of the GPC column with sulfonated polystyrene compounds.

The advantage of the invention process for polymerization of lignosulfonate is illustrated in FIG. 1 which shows the net increase in weight-average molecular weight ($+d\overline{M}w$) of a softwood lignosulfonate at various pH values by the invention process as compared to a prior art method as exemplified in U.S. Pat. No. 3,138,555.

Both reactions were carried out at 160° C. for 1.5 hours with 30 percent solutions. The prior art process is a one-step process whereby lignin is heated at acidic pH without pre-methylolation. The prior art method has a tendency to hydrolyze the lignin under strongly acidic conditions and the efficiency to polymerize the lignosulfonate is rather poor. The efficiency was improved by raising the reaction solids concentration to about 85 percent as disclosed in U.S. Pat. No. 4,100,155.

FIG. 2 illustrates further advantage of the invention process over yet another prior art lignosulfonate condensation process. The drawing illustrates the difference normalized GPC curves of two polymerized lignosulfonates, one by the invention two-step process (A) and the other by the prior art process (B) whereby a softwood lignosulfonate is heated with formaldehyde at pH 1 without pre-methylolation. As is apparent from the drawing, the invention process effects condensation of the lignosulfonate to a greater extent than the prior art one-step formaldehyde condensation process and such higher molecular weight is obtained without gelling of the 30 percent lignosulfonate solution. In contrast, the prior art product is a gel.

As used herein, the term "lignosulfonate" has its normal connotation and refers to sulfonated lignin derived from the sulfite pulping process wherein the lignocellulosic material is digested with bisulfite or sulfite materials. Thus the term is intended to include lignosulfonate products including spent sulfite liquors, which materials may be further reacted, desugared, purified, fractionated or the like. The term is not inclusive of alkali lignin or sulfonated alkali lignin. Lignosulfonates are water-soluble polymers and may be purified and recovered from the pulping liquor, if desired, by amine precipitation, membrane separation and other methods. Alkali lignins, as derived from soda and kraft pulping liquors, are practically water-insoluble. Such lignin materials are purified by acidification and precipitation procedures and may be subsequently sulfonated to form sulfonated alkali lignins. The chemical structure and reactivities of the two classes of materials are vastly different. One major difference is that sulfonated alkali lignin is readily condensed with formaldehyde to form high molecular weight products under alkaline conditions whereas, as illustrated in FIG. 1, lignosulfonates are not reactive under these conditions.

In accordance with the invention, lignosulfonate material is methylolated in the first step through reaction of lignosulfonate with from 0.5 to 4.5 moles formaldehyde per 1,000 grams of lignin at a temperature of 60° C. to 90° C. for a time period varying from 10 minutes to 2 hours. The pH of the methylolation medium is adjusted to from 10 to 12 to ionize the phenolic hydroxyl groups. It is desirable to avoid pH values above about 12 in order to minimize disproportionation of formaldehyde to inactive compounds. Lignosulfonate has been found to be generally more reactive with formaldehyde than alkali lignins, and will normally consume all formaldehyde added within the specified time period. However, the residual formaldehyde can be determined by a titration technique and longer reaction times may be employed to ensure that all formaldehyde is consumed, if desired.

In the second step of the invention process, the methylolated lignosulfonate solution is pH adjusted to below 7, preferably between 3 to 6, with hydrochloric, sulfuric, acetic or other strong acids. The solution is then heated at a temperature between 90° C. to 180° C., depending on the rate of polymerization desired. Higher temperatures will normally require shorter reaction time to reach a certain degree of polymerization.

FIG. 1 shows the effect of the reaction pH on the degree of polymerization. As illustrated, premethylolated lignosulfonate in accordance with the invention is relatively inactive at alkaline pH, but becomes rapidly polymerized when the pH approaches neutral followed by only a slight increase in condensation from pH 7 to 2. Below pH 2, the rate of polymerization again accelerates. FIG. 1 also shows the polymerization rate of the same lignosulfonate which is not premethylolated, but otherwise heated in the same manner in the presence of formaldehyde in accordance with the prior art. While not wishing to be bound by theory, it is believed that the inability of methylolated lignosulfonate to condense in alkaline solution is probably due to ionization of sulfonate and carboxylic groups creating repulsive charges which prevent the close approach of molecules that is necessary for condensation to occur. Premethylolation followed by acidic polymerization is believed to permit the achievement of higher molecular weights by elimination of the electronic constraints.

It has been determined that the higher the temperature, the faster the reaction will proceed and the shorter will be the reaction time. With temperatures above 100° C. the reaction time normally is about 1 to 5 hours. Solids concentration of the reaction solution can vary from 10 percent to 55 percent without adverse effect. At the low concentration range, little hydrolysis of lignofulfonate has been observed, in contrast to what was found with the prior art acid polymerization process. At the high concentration range, no gelling occurs in the invention process.

The method of the invention provides compositions that are useful as dye dispersants. Accordingly, dyestuff compositions which comprise the fluid, polymerized lignosulfonate produced by the invention method and a water-insoluble dye may be readily obtained. In such a dyestuff composition, the lignosulfonate material will be present in a weight ratio to the dye of about 0.5:1 to 2:1. The dye will preferably be selected from the group consisting of disperse and vat dyes, and will most desirably be an azo or quinone dye.

The following detailed examples illustrate more particularly the benefits and advantages obtained in the present invention.

EXAMPLE 1

200 parts of Norlig 92, a softwood fermented and substantially desugared lignosulfonate available from American Can Company, was dissolved in 370 parts by weight of water to make up a 35 percent solution. The solution was pH adjusted to 11 with sodium hydroxide and heated with 18 parts of formaldehyde (or 3 moles per 1,000 grams of lignosulfonate) at 70° C. After heating for one hour, the formaldehyde was completely consumed, and the pH dropped to 10.1. The solution was pH adjusted to 1.1 with concentrated (36.5 percent) hydrochloric acid and heated at 160° C. for one hour. The lignosulfonate solution had a final pH of 1.8 and a viscosity of 60 cps at 25° C.

EXAMPLE 2

200 parts of Norlig 82, a softwood lignosulfonate containing about 20% reducing sugars by weight of the product and available from American Can Company, was dissolved in 370 parts by weight of water to make up a 35 percent solution. The solution was pH adjusted to 11 with sodium hydroxide and heated with 18 parts of formaldehyde at 70° C. for one hour. The solution was subsequently pH adjusted to 1.1 with concentrated hydrochloric acid and heated at 160° C. for 1.5 hours. The resultant solution had a pH of 2.7 and a viscosity of 287 cps at 25° C.

EXAMPLE 3

(Comparative)

The softwood lignosulfonate of Example 1 (200 parts) was dissolved in 370 parts by weight of water to make up a 35 percent solution. The solution was pH adjusted to 1.0 with concentrated hydrochloric acid and heated at 100° C. with 18 parts of formaldehyde for 2 hours. The final pH of the solution was 1.0 and viscosity was 440 cps at 25° C.

EXAMPLE 4

(Comparative)

The softwood lignosulfonate was treated with formaldehyde as in Example 3 for 4.5 hours. The sample gelled at the end of the cooking time.

The viscosity data and rates of polymerization of the solutions of Examples 1 to 4 are summarized in Table 1 which follows.

In the Table, the degree of condensation is defined as the percent by weight of condensed lignosulfonate which exhibits higher molecular weight than the uncondensed lignosulfonate.

TABLE 1

Polymerization Rate and Viscosity Increase in Treatments of Lignosulfonate with Formaldehyde.

| Sample | Viscosity 25° C. (cps) | Degree of Condensation (%) |
|---|---|---|
| Example 1 | 60 | 11.6 |
| Example 2 | 287 | 29.3 |
| Examole 3 | 440 | 7.6 |
| Example 4 | 100,000 | 29.2 |

It will be seen from the Table that methylolation of the lignosulfonate prior to acid polymerization results in the production of low viscosity, high molecular weight materials while one-step treatment of lignosulfonate under acidic conditions tends to cause excessive viscosity build-up or gelling, even at moderate temperature.

EXAMPLE 5

A softwood spent sulfite liquor at 30% concentration was cooked at 90° C. with 15 parts by weight of sodium hydroxide to revert the reducing sugars therein. The liquor was then heated with 9 parts by weight of formaldehyde at 70° C., pH 11 for 2 hours. The methylolated spent sulfite liquor was adjusted to various pHs and heated at 160° C. for 1.5 hours. The effects of pH on viscosity and molecular weight of the lignosulfonate are shown in Table 2.

TABLE 2

Effects of Polymerization Reaction pH on Viscosity and Molecular Weight of Methylolated Lignosulfonate.

| Reaction pH | Viscosity (cps) | $\overline{M}w$ | $+d\,\overline{M}w$ |
|---|---|---|---|
| Untreated | 26 | 8,520 | 0 |
| 11.5 | 26 | 8,520 | 0 |
| 10.4 | 40 | 10,440 | 1,920 |
| 9.5 | 39 | 9,630 | 1,110 |
| 8.2 | 39 | 9,900 | 1,400 |
| 7 | 85 | 13,890 | 5,370 |
| 5 | 66 | 15,570 | 7,050 |
| 3 | 44 | 15,430 | 6,910 |
| 2 | 79 | 15,920 | 7,400 |
| 0.86 | 1932 | 17,740 | 9,220 |

Note:
$\overline{M}w$ = weight − average molecular weight;
$+d\,\overline{M}w = \overline{M}w - 8,520$

EXAMPLE 6

The sugar-reverted spent sulfite liquor as in Example 5 (at 30 percent concentration) was adjusted to various pHs and heated at 160° C. for 1.5 hours. The effects of pH on viscosity and molecular weight of the lignosulfonate are shown in Table 3. A comparison of Tables 2 and 3 indicates that the two-step process of the invention is a more effective polymerization process than the prior art process of U.S. Pat. No. 3,138,555. Moreover, the prior art process tends to cause hydrolysis of lignosulfonate, resulting in a reduction of molecular weight in strongly acidic solution.

TABLE 3

Effects of Polymerization Reaction pH on Viscosity and Molecular Weight of Non-Methylolated Lignosulfonate (U.S. Pat. No. 3,138,555).

| Reaction pH | Viscosity (cps) | $\overline{M}w$ | $+d\,\overline{M}w$ |
|---|---|---|---|
| Untreated | 26 | 8,520 | 0 |
| 7.1 | 30 | 9,370 | 850 |
| 5 | 29 | 9,820 | 1,300 |
| 3 | 28 | 9,020 | 500 |
| 0.9 | 34 | 8,970 | 450 |

EXAMPLE 7

This example illustrates the beneficial effects of polymerization on foaming characteristics of lignosulfonate dye dispersant. The sugar-reverted spent sulfite liquor as in Example 5 (100 parts) was methylolated with 9 parts by weight of formaldehyde at pH 11 and 70° C. for 2 hours. The pH of the solution was then reduced to pH 2 and heated at 160° C. for various time periods. The resultant products were evaluated for their foaming tendency in the following manner: One gram of solids of a product was dissolved in 100 milliliters of tap water. The pH was adjusted to pH 5 with acetic acid after which the solution was poured into a 250-ml graduated cylinder. The cylinder was rapidly inverted 5 times after which the height of the foam was measured immediately in milliliters and measured again after one and two minutes. If the foam disappeared within one minute, the time at which all foam vanished was noted. The results of the foaming tests are presented in Table 4. It can be seen from the Table that the invention process advantageously reduces the foaming tendency of the lignosulfonate.

TABLE 4

Foaming Tendency of Polymerized Lignosulfonate.

| Heating Time (hours) | Foaming Height (ml) | | |
|---|---|---|---|
| | Initial | 1 min. | 2 min. |
| 1 | 27 | 6 | 2 |
| 1.5 | 21 | Breaks in 30 seconds | |
| 2.5 | 24 | Breaks in 50 seconds | |
| 3.5 | 29 | 5 | 1 |
| Untreated | 40 | 10 | 7 |

EXAMPLE 8

The polymerized lignosulfonates of Examples 1 and 3 were evaluated with Disperse Blue 102 dye for their milling efficiency and heat stability. In the test, the dye and lignin (ratio 100:60) were milled in a sand mill for 2 hours. One gram of dye paste solids was diluted with 100 milliliters of distilled water and boiled for 15 minutes. The solution was filtered through a Whatman No. 2 filter paper. Low residue weight and non-specking of the paper are the criteria for passing the test. Table 5 shows that the polymerized lignosulfonate of the invention process gives good milling, heat stability and low dye paste viscosity.

TABLE 5

Milling (Dispersing) and Heat Stability Characteristics of Lignin Dispersants.

| Dispersant* | Milling Efficiency | | Heat Stability | | Dye Paste Viscosity** (cps) |
|---|---|---|---|---|---|
| | Residue (mg) | Filtration Time (sec.) | Residue (mg) | Speck-ing | |
| Example 1 | 60 | 6.5 | 32 | No | 82 |
| Example 3 | 70 | 7.5 | 350 | Yes | 116 |
| Reax 85A | 120 | 17.5 | 31 | No | 540 |
| Marasperse 52CP | 70 | 9.5 | 28 | No | 490 |
| Tamol SN | 1440 | 32 | 400 | Very Bad | 734 |

*Reax 85A - Sulfonated kraft lignin from Westvaco Corp.
Marasperse 52CP - Lignosulfonate from American Can Co.
Tamol SN - Naphthalene Sulfonate from Rohm & Hass Chemical Co.
**Dye paste concentration, 45% solids.

It will be seen from the aforegoing description that the invention provides a method wherein lignosulfonates may be polymerized to higher molecular weights without gelling or undue viscosity buildup.

The materials are particularly useful as dispersing agents and most notably as dye dispersants.

I claim:

1. A method for polymerizing lignosulfonate materials which comprises:
   (1) reacting a mixture of a lignosulfonate and formaldehyde while maintaining said reaction mixture under alkaline conditions for a period sufficient to form a methylolated lignosulfonate; and
   (2) effecting condensation of said methylolated lignosulfonate having a solids concentration from 10 to 55 percent under neutral or acidic conditions for a period sufficient to produce a fluid lignosulfonate of increased molecular weight.

2. The method of claim 1 in which said lignosulfonate is reacted in step (1) at a pH within the range of about 10 to 12.

3. The method of claim 2 in which step (1) is conducted at a temperature within the range of about 60° C. to 90° C. for a period of time ranging from about 10 minutes to 2 hours.

4. The method of claim 3 in which said formaldehyde is present in an amount within the range of about 0.5 to about 4.5 moles of formaldehyde per 1,000 grams of lignosulfonate.

5. The method of claim 1 wherein step (2) is conducted at a pH below about 7 and a temperature within the range of about 90° C. to about 180° C.

6. The method of claim 1 wherein said lignosulfonate is spent sulfite liquor.

7. The method of claim 6 wherein said spent sulfite liquor has been at least partially desugared.

8. A method for polymerizing lignosulfonate materials which comprises:
   (1) reacting a mixture of a lignosulfonate derived from spent sulfite liquor and from about 0.5 to 4.5 moles formaldehyde per 1,000 grams of lignosulfonate while maintaining the reaction mixture of lignosulfonate at a pH within the range of about 10 to 12 and a temperature of about 60° C. to about 90° C. for a period sufficient to form a methylolated lignosulfonate; and
   (2) effecting condensation of said methylolated lignosulfonate by subjecting the reaction mixture of step (1) having a solids concentration from 10 percent to 55 percent to a temperature of about 90° C. to about 180° C. while maintaining a pH below 7 for a period sufficient to produce a fluid lignosulfonate of increased molecular weight.

9. The method of claim 8 wherein step (1) is effected for a period ranging from about 10 minutes to 2 hours, the pH is within the range of 10.5 to 11.5 and the temperature is between 70° C. to 80° C.

10. The method of claim 9 wherein step (2) is effected for a period ranging from about 1 to 5 hours, the pH is within the range of 3 to 6, and the temperature is between about 120° C. to 160° C.

11. As a composition of matter, a fluid polymerized lignosulfonate derived by acidic condenation of a premethylolated lignosulfonate material having a solids concentration from 10 to 55 percent at elevated temperatures under acidic or neutral conditions, said premethylolated lignosulfonate having been obtained by reaction of a lignosulfonate and formaldehyde under alkaline conditions.

12. The composition of claim 11 wherein said lignosulfonate material is derived from spent sulfite liquor.

13. The composition of claim 12 wherein said spent sulfite liquor is at least partially desugared.

14. The composition of claim 11 wherein said premethylolated lignosulfonate material has been condensed by subjection to a temperature within the range of about 90° C. to about 180° C. at a pH below about 7.

15. The composition of claim 11 wherein said premethylolated lignosulfonate is the product of the reaction of lignosulfonate with from about 0.5 to about 4.5 moles formaldehyde per 1,000 grams of lignosulfonate at a pH of about 10 to 12 and a temperature of about 60° C. to 90° C.

16. As a composition of matter, a fluid polymerized lignosulfonate derived by condensation of a premethylolated lignosulfonate material having a solids concentration from 10 percent to 55 percent at a pH below about 7 and a temperature within the range of about 90° C. to about 180° C.; said premethylolated lignosulfonate being the product of the reaction of lignosulfonate with from about 0.5 to 4.5 moles of formaldehyde per 1,000 grams of lignosulfonate at a pH of about 10 to 12 and a temperature of about 60° C. to about 90° C.

17. The composition of claim 16 wherein said premethylolated lignosulfonate is condensed at a pH within the range of 3 to 6 and a temperature of about 70° C. to 80° C. for a least 1 hour.

18. The composition of claim 17 wherein said premethylolated lignosulfonate is obtained by reaction at a pH within the range of about 10.5 to 11.5 and a temperature of about 70° C. to 80° C.

19. A dyestuff composition comprising a water-insoluble dye and a fluid, polymerized lignosulfonate of claim 11, said lignosulfonate being present in a weight ratio to said dye of from about 0.5:1 to 2:1.

20. The composition of claim 19 wherein said dye is selected from the group consisting of disperse and vat dyes.

* * * * *